(12) United States Patent
Yuan et al.

(10) Patent No.: US 12,111,470 B2
(45) Date of Patent: Oct. 8, 2024

(54) OPTICAL SYSTEM AND MIXED REALITY DEVICE

(71) Applicant: Nanchang Tripole Optoelectronics CO., Ltd., Nanchang (CN)

(72) Inventors: Junqi Yuan, Nanchang (CN); Yusheng Ma, Nanchang (CN)

(73) Assignee: NANCHANG TRIPOLE OPTOELECTRONICS CO., LTD., Nanchang (CN)

( * ) Notice: Subject to any disclaimer, the term of this patent is extended or adjusted under 35 U.S.C. 154(b) by 534 days.

(21) Appl. No.: 17/557,833

(22) Filed: Dec. 21, 2021

(65) Prior Publication Data

US 2022/0276489 A1    Sep. 1, 2022

(30) Foreign Application Priority Data

Feb. 28, 2021    (CN) .......................... 202110222101.3

(51) Int. Cl.
*G02B 27/01*    (2006.01)
*G02B 5/18*    (2006.01)
(Continued)

(52) U.S. Cl.
CPC ....... *G02B 27/0172* (2013.01); *G02B 5/1866* (2013.01); *G02B 5/32* (2013.01);
(Continued)

(58) Field of Classification Search
CPC .... G02B 27/0172; G02B 5/1866; G02B 5/32; G02B 6/34; G02B 2027/0174;
(Continued)

(56) References Cited

U.S. PATENT DOCUMENTS 6,285,813 B1 *    9/2001    Schultz ................... G02B 6/34
385/37
2017/0242249 A1    8/2017    Wall et al.
(Continued)

FOREIGN PATENT DOCUMENTS

CN    1774661 A    5/2006
CN    102809825 A    12/2012
(Continued)

OTHER PUBLICATIONS

Anonymous, Head-up display—Wikipedia, Nov. 26, 2020, pp. 1-13, retrieved from the Internet on Apr. 20, 2022.
(Continued)

*Primary Examiner* — Collin X Beatty
(74) *Attorney, Agent, or Firm* — METIS IP LLC

(57) ABSTRACT

Provided are an optical system and a mixed reality device. The optical system includes a projection apparatus, a substrate layer and a diffraction grating layer. The projection apparatus is configured to project two beams of image light. The substrate layer has two side surfaces and two planes, where each of the two side surfaces is configured to receive a respective one of the two beams of the image light, and the two planes are configured to totally reflect each of the two beams of the image light entering the substrate layer. The diffraction grating layer is disposed on at least one plane of the substrate layer and is configured to diffract, in a reflective manner or a transmissive manner, the two beams of the image light propagating in the substrate layer, where energy of target image light diffracted out of the diffraction grating layer is uniformly distributed.

18 Claims, 4 Drawing Sheets

(51) Int. Cl.
*G02B 5/32* (2006.01)
*G02B 6/34* (2006.01)
(52) U.S. Cl.
CPC ........ *G02B 6/34* (2013.01); *G02B 2027/0174* (2013.01); *G02B 2027/0178* (2013.01)
(58) Field of Classification Search
CPC ........ G02B 2027/0178; G02B 27/0081; G02B 27/4272; G02B 27/0101; G02B 27/0103; G02B 30/35; G02B 27/1086; G02B 27/4227

See application file for complete search history.

(56) References Cited

U.S. PATENT DOCUMENTS

| | | |
|---|---|---|
| 2018/0292653 A1 | 10/2018 | Tervo |
| 2018/0299678 A1 | 10/2018 | Singer et al. |
| 2020/0264434 A1 | 8/2020 | Shin et al. |
| 2020/0341280 A1 | 10/2020 | Bablumyan et al. |

FOREIGN PATENT DOCUMENTS

| | | |
|---|---|---|
| CN | 104614870 A | 5/2015 |
| CN | 105278106 A | 1/2016 |
| CN | 106526730 A | 3/2017 |
| CN | 107015368 A | 8/2017 |
| CN | 107632406 A | 1/2018 |
| CN | 107966819 A | 4/2018 |
| CN | 108803022 A | 11/2018 |
| CN | 108828780 A | 11/2018 |
| CN | 108873350 A | 11/2018 |
| CN | 108919488 A | 11/2018 |
| CN | 208092343 U | 11/2018 |
| CN | 208092344 U | 11/2018 |
| CN | 108957757 A | 12/2018 |
| CN | 109521506 A | 3/2019 |
| CN | 109983393 A | 7/2019 |
| CN | 110582716 A | 12/2019 |
| CN | 111158153 A | 5/2020 |
| CN | 111722317 A | 9/2020 |
| CN | 211554374 U | 9/2020 |
| CN | 211603731 U | 9/2020 |
| CN | 111999894 A | 11/2020 |
| CN | 112346251 A | 2/2021 |
| JP | 2019012259 A | 1/2019 |
| JP | 2020046530 A | 3/2020 |
| TW | 201928447 A | 7/2019 |
| WO | 2019157987 A1 | 8/2019 |

OTHER PUBLICATIONS

China National Intellectual Property Administration, International Search Report, Oct. 26, 2021, for International Application No. PCT/CN2021/094734.
European Patent Office, European Search Report, Jun. 30, 2022, for European Application No. 22153750.9.
Rokid, Understanding Waveguide the Key Technology for Augmented Reality Near-eye Display (Part II), AR/VR Journey: Augmented & Virtual Reality Magazine, Sep. 23, 2019, retrieved from the Internet on Mar. 25, 2021.
Japanese Patent Application No. 2021-208369, 2nd Office Action, mailed Jul. 25, 2023.
Japenese Patent Application No. 2021-208369, Office Action, mailed Jan. 6, 2023.
Taiwanese Patent Application No. 11220484060, Office Action, mailed May 12, 2023.

* cited by examiner

OPTICAL SYSTEM AND MIXED REALITY DEVICE

CROSS-REFERENCE TO RELATED APPLICATION

This application claims priority to Chinese Patent Application No. 202110222101.3 filed on Feb. 28, 2021, the disclosure of which is incorporated herein by reference in its entirety.

TECHNICAL FIELD

The present application relates to the field of optoelectronics technology and, in particular, to an optical system and a mixed reality device.

BACKGROUND

A mixed reality device includes a virtual reality device and an augmented reality device. The virtual reality device merely presents virtual image information to a user and external ambient light cannot enter the user's eyes through the virtual reality device, and the augmented reality device can simultaneously present the virtual image information and the external ambient light to the user's eyes.

The optical waveguide technique, as one kind used in optical systems in the mixed reality device, obtains more attention due to its lightness and high penetrability for external light.

SUMMARY

An optical system is first provided in embodiments of the present application and includes a projection apparatus, a substrate layer and a diffraction grating layer. The projection apparatus is configured to project two beams of image light. The substrate layer has two side surfaces and two planes, where each of the two side surfaces is configured to receive a respective one of the two beams of the image light from the projection apparatus, and the two planes are configured to totally reflect each of the two beams of the image light entering the substrate layer. The diffraction grating layer is disposed on at least one plane of the substrate layer and is configured to diffract, in a reflective manner or a transmissive manner, the two beams of the image light propagating in the substrate layer, where energy of target image light diffracted out of the diffraction grating layer is uniformly distributed.

A mixed reality device is further disclosed in embodiments of the present application and includes a data processing module and the above optical system. The data processing module is configured to transmit image information to be displayed to the projection apparatus of the optical system to display an image.

The objects and features of the present application will be set forth in the following description to some extent, and will be apparent to those skilled in the art based on the following investigation to some extent, or may be taught from the practice of the present application. The objects and other advantages of the present application can be achieved and obtained through the structures especially indicated in the description, claims and drawings.

BRIEF DESCRIPTION OF DRAWINGS

The drawings are used to provide a further understanding of schemes of the present application or the related art, and form a part of the description. The drawings illustrating embodiments of the present application, together with the embodiments of the present application, are used to explain the schemes of the present application, but do not constitute a limitation of the schemes of the present application.

DETAILED DESCRIPTION

Hereinafter, the implementation modes of the present application will be described in detail with reference to the drawings and embodiments, so as to fully understand and implement the implementation process of how the present application applies technical means to solve technical problems and achieves corresponding technical effects. If not in collision, the embodiments of the present application and features therein may be combined with each other and the formed schemes fall within the scope of the present application.

Figure 1:
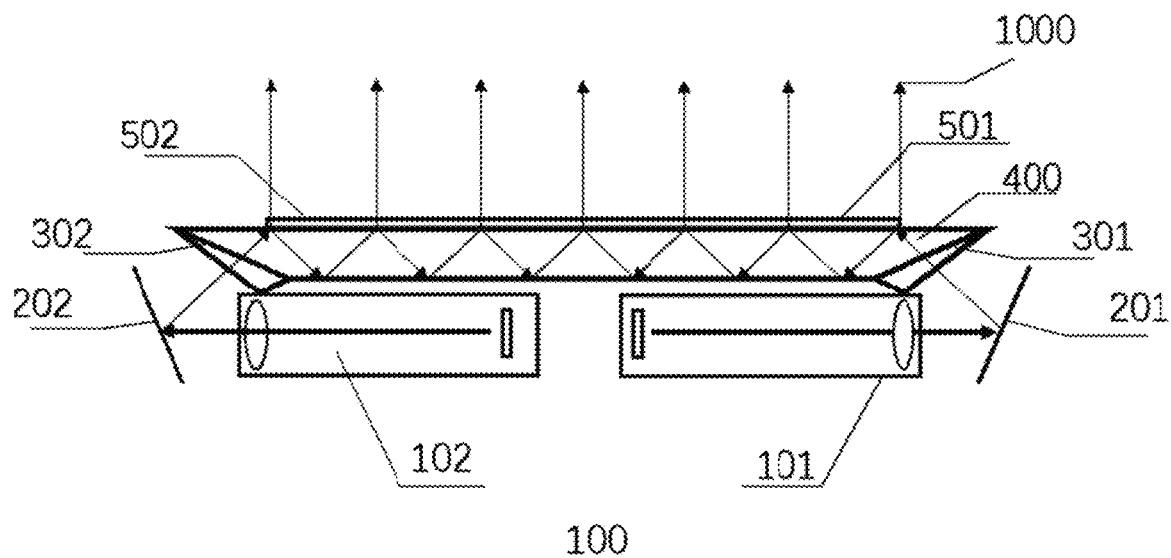
FIG. 1 is a structural diagram of an optical system according to an embodiment of the present application.

Referring to FIG. 1, an optical system 100 is disclosed in an embodiment of the present application and includes projection apparatuses 101 and 102, a substrate layer 400 and a diffraction grating layer.

The projection apparatuses are configured to project two beams of image light. There may be one projection apparatus projecting two beams of image light, for example, light projected by one projection apparatus is split into two beams of image light in a beam splitting manner. In some embodiments, in a manner shown in FIG. 1, each of two projection apparatuses 101 and 102 may emit a respective one of two beams of image light. The two projection apparatuses 101 and 102 may be disposed symmetrically with respect to a perpendicular line passing through center positions of two planes of the substrate layer 400.

The substrate layer 400 has two side surfaces configured to respectively receive the two beams of image light from the projection apparatuses 101 and 102, and two planes configured to totally reflect the two beams of the image light entering the substrate layer 400. Referring to FIG. 1, for example, the substrate layer 400 may be trapezoidal in cross-section, and two side surfaces of the substrate layer 400 are configured to receive the two beams of the image light, respectively, where the two beams of the image light propagate between two opposite planes in a total reflective manner, respectively. Specifically, one beam of image light is incident into the substrate layer 400 through one side surface, and the image light propagates toward the other side surface between two opposite planes of the substrate layer 400 in a total reflective manner.

The diffraction grating layer 501 and 502 is disposed on at least one plane of the substrate layer 400 and configured to diffract, in a reflective manner or a transmissive manner, the two beams of the image light propagating in the substrate layer 400. Energy of target image light 1000 diffracted out of the diffraction grating layer 501 and 502 is uniformly distributed. Both the two beams of the image light may be emitted through the optical system 100, thereby achieving the effect of pupil continuity. When the image light propagates in the substrate layer 400 and encounters a plane disposed on the substrate layer 400, the image light is emitted out of the substrate layer 400 in a reflective diffraction manner or a transmissive diffraction manner, and the image light emitted out of the substrate layer 400 is referred to as the target image light 1000. For example, the diffraction grating layer is divided into two layers, one layer is disposed on a plane below the substrate layer 400 and the other layer is disposed on a plane above the substrate layer 400, where the image light corresponding to one layer is emitted in the reflective diffraction manner and the image light corresponding to the other layer is emitted in the transmissive diffraction manner. In another example, referring to FIG. 1, the diffraction grating layer 501 and 502 is one layer, and one diffraction grating layer 501 and 502 is attached on one plane of the substrate layer 400. The image light is emitted out of the substrate layer 400 in the transmissive diffraction manner. When the image light encounters the diffraction grating layer, the image light is emitted in the transmissive diffraction manner, and the energy of the emitted target image light 1000 is uniformly distributed. In FIG. 1, a left portion of the diffraction grating layer is labeled as 502, and a right portion of the diffraction grating layer is labeled as 501. The left portion and the right portion of the diffraction grating layer are actually an integrated diffraction grating layer. The energy of the emitted target image light 1000 is uniformly distributed on the diffraction grating layer, that is, the energy of the emitted target image light 1000 corresponding to different positions of the diffraction grating layer is equal. A center position of the diffraction grating layer 501 and 502 may coincide with a center position of the substrate layer 400.

The projection apparatuses 101 and 102, the substrate layer 400 and the diffraction grating layer 501 and 502 are provided, so that the energy of the target image light 1000 emitted from the optical system 100 is uniformly distributed, and the optical system 100 is more compact. The target image light 1000 emitted out of the optical system 100 may correspond to two eyes of the user separately. There is no need to provide a respective one of two different optical systems for each eye of the user, and the sense of the immersion of the mixed reality device with the optical system 100 is better.

In some embodiments, each of the projection apparatuses 101 and 102 may include a projection lens and a display screen. The display screen is configured to load image information to be displayed, thereby emitting the image information to be displayed to the projection lens in a form of light. The projection lens may be configured to collimate the image information (image light) in the form of light and pass the image information to downstream of the optical paths. Each of the projection apparatuses 101 and 102 may be attached on a respective one of the two side surfaces of the substrate layer 400.

In some embodiments, referring to FIG. 1, the optical system 100 may further include two coupling prisms 301 and 302, where each of the two coupling prisms 301 and 302 is disposed on a respective one of the two side surfaces of the substrate layer 400, and each of the two coupling prisms 301 and 302 is configured to couple a respective one of the two beams of the image light from a respective one of the projection apparatuses 101 and 102 into the substrate layer 400 through a respective one of the two side surfaces. The image light emitted from the projection apparatus 101 may be incident into the substrate layer 400 via the coupling prism 301 and through one side surface of the substrate layer 400, and the image light emitted from the projection apparatus 102 may be incident into the substrate layer 400 via the coupling prism 302 and through the other side surface of the substrate layer 400. Each of the two coupling prisms 301 and 302 may be glued on a respective one of the two side surfaces of the substrate layer 400, and each of the projection apparatuses 101 and 102 is attached on a respective one of the two coupling prisms 301 and 302. The two projection apparatuses 101 and 102 may be disposed symmetrically with respect to a perpendicular line passing through center positions of two planes of the substrate layer 400, and the two coupling prisms 301 and 302 may also be disposed symmetrically with respect to the perpendicular line passing through the center positions of two planes of the substrate layer 400.

In some embodiments, the optical system 100 may further include two reflective elements 201 and 202, where each of the two reflective elements 201 and 202 is disposed on a respective one of optical paths where the two beams of the image light from the projection apparatuses 101 and 102 are incident on the two coupling prisms 301 and 302, and each of the two reflective elements 201 and 202 is configured to reflect a respective one of the two beams of the image light from the projection apparatuses 101 and 102 to a respective one of the two coupling prisms 301 and 302. The image light emitted from the projection apparatuses 101 and 102 is reflected by the reflective elements 201 and 202 and then enters the coupling prisms 301 and 302. The coupling prisms 301 and 302 couple the image light into the substrate layer 400. Each of the two coupling prisms 301 and 302 may be attached on a respective one of the two side surfaces of the substrate layer 400, and the projection apparatuses 101 and 102 may be disposed parallel to a plane of the substrate layer 400. If the projection apparatuses 101 and 102 are disposed close to edges of the substrate layer 400 or outer sides of the substrate layer 400, the incident ambient light into the human eye through the substrate layer 400 and the diffraction grating layer 501 and 502 is not affected, and the optical system 100 can achieve the effect that both the image light and the external ambient light are incident into the human eyes. The substrate layer 400 and the diffraction grating layer 501 and 502 may be made of, for example, transparent optical glass and transparent optical plastic. The substrate layer 400 and the diffraction grating layer 501 and 502 having high transmittance may reduce absorption of light by the substrate layer 400 and the diffraction grating layer 501 and 502. Referring to FIG. 1, if the projection apparatuses 101 and 102 are disposed close to the center position of the substrate layer 400, the incident ambient light into the human eyes through the substrate layer 400 and the diffraction grating layer 501 and 502 is affected, and the optical system 100 can merely achieves the effect that the image light is incident into the human eyes. Each of the two reflective elements 201 and 202 is angled with respect to a respective one of the two projection apparatuses 101 and 102 and a respective one of the two coupling prisms 301 and 302 to reflect the image light emitted from the respective one of the two projection apparatuses 101 and 102 into the respective one of the two coupling prisms 301 and 302. The two projection apparatuses 101 and 102 may be disposed symmetrically with respect to the perpendicular line passing through the center positions of two planes of the substrate layer 400, the two coupling prisms 301 and 302 may also be disposed symmetrically with respect to the perpendicular line passing through the center positions of two planes of the substrate layer 400, and the two reflective elements 201 and 202 may also be disposed symmetrically with respect to the perpendicular line passing through the center positions of two planes of the substrate layer 400. The two projection apparatuses 101 and 102, the two reflective elements 201 and 202, and the two coupling prisms 301 and 302 share the common substrate layer 400 and the diffraction grating layer 501 and 502, thus making the optical system 100 more compact and smaller.

Figure 2:
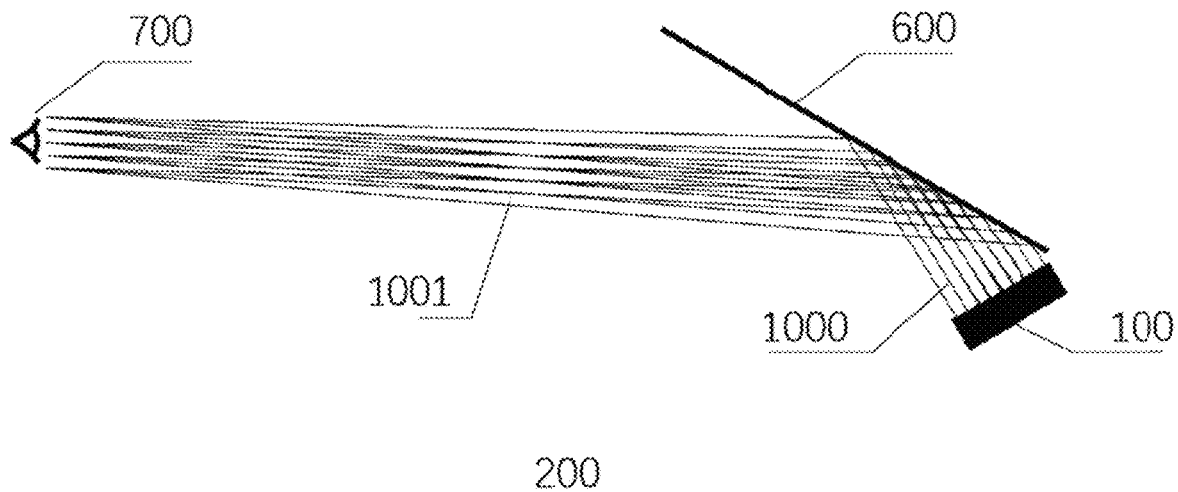
FIG. 2 is a structural diagram of an optical system according to another embodiment of the present application.
Figure 3:
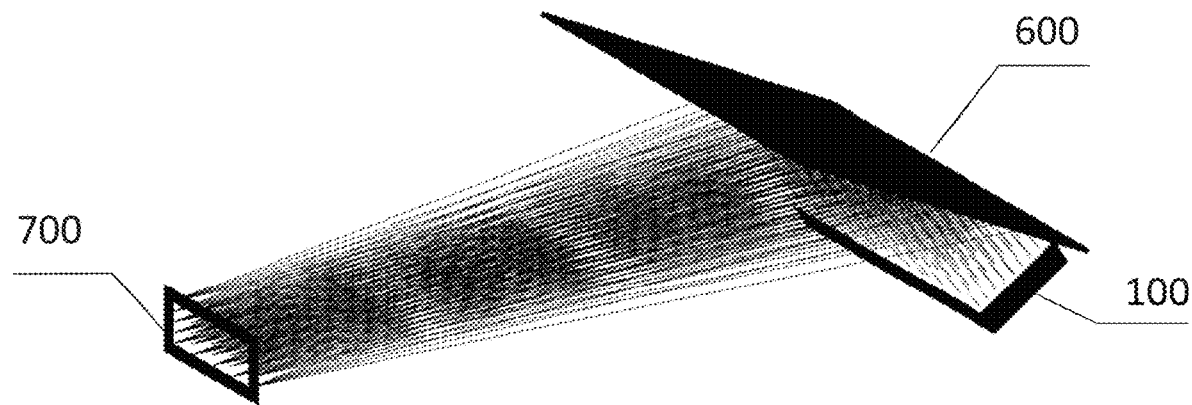
FIG. 3 is a view from another angle of FIG. 2.

In some embodiments, referring to FIGS. 2 and 3, the optical system 200 may further include a transflective element 600. The transflective element 600 is disposed on optical paths where the target image light 1000 diffracted out of the diffraction grating layer 501 and 502 is incident into the human eyes 700, and configured to reflect the target image light 1000 diffracted out of the diffraction grating layer 501 and 502 into the human eyes and transmit the ambient light into the human eyes 700. When the optical system 100 can merely achieve the effect that the image light is incident into the human eyes, the transflective element 600 may be added in the optical system 100. The target image light 1000 emitted from the optical system 100 is reflected by the transflective element 600 to obtain image light 1001. The image light 1001 can be incident into the human eyes 700, and the ambient light transmitted through the transflective element 600 can be incident into the human eyes 700. The optical system 200 can achieve the effect that both the image light and the external ambient light are incident into the human eyes 700. An exit pupil in a rectangular shape is located at the human eyes 700.

Figure 4:
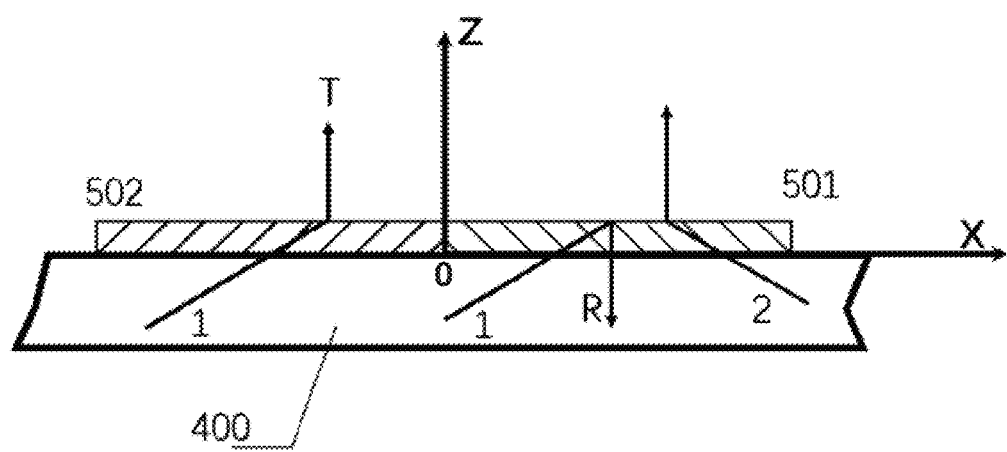
FIG. 4 is a structural diagram of a substrate layer and a diffraction grating layer in an optical system according to an embodiment of the present application.

In the above optical system, referring to FIG. 4, when the diffraction grating layer 501 and 502 is disposed on one plane of the substrate layer 400, such as disposed on the upper surface of the substrate layer 400, grating fringes of the diffraction grating layer 501 and 502 (which as a whole is one diffraction grating layer) are distributed axisymmetrically with respect to a direction (a Z axis shown in FIG. 4) perpendicular to the diffraction grating layer 501 and 502 and passing through a preset position point, where the preset position point (point 0 shown in FIG. 4) is located on the diffraction grating layer 501 and 502. An X axis in FIG. 4 is located between the substrate layer 400 and the diffraction grating layer 501 and 502, point 0 is located at a center position (point 0 is located at a boundary between the portion 501 of the diffraction grating layer and the portion 502 of the diffraction grating layer) of the diffraction grating layer 501 and 502, and the Z axis is a direction perpendicular to the diffraction grating layer 501 and 502 from point 0. The diffraction grating layer 501 and 502 may be a holographic grating or may be a surface relief grating.

Figure 5:
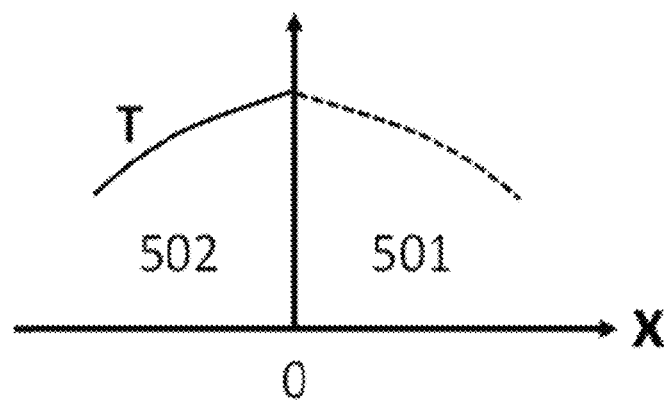
FIG. 5 is a diffraction efficiency diagram of image light in an optical system according to an embodiment of the present application.

Referring to FIG. 5, in the case where the two beams of the image light are diffracted by the diffraction grating layer 501 and 502 in the transmissive manner, in a direction from one edge of the diffraction grating layer 501 and 502 to the preset position point, the transmissive diffraction efficiency of the image light passing through the substrate layer 400 gradually increases; and in a direction from the preset position point to the other edge of the diffraction grating layer 501 and 502, the reflective diffraction efficiency of the image light passing through the substrate layer 400 gradually decreases. An incident light 1 (both a transmitted diffracted light with −1 level and a reflected diffracted light with −1 level are perpendicular to a plane of the substrate layer 400) shown in FIG. 4 propagates along a direction from the portion 502 of the diffraction grating layer to the portion 501 of the diffraction grating layer. As can be seen from the distribution of the transmissive diffraction efficiency T of the incident light 1 on the portion 502 of the diffraction grating layer and the reflective diffraction efficiency R of the incident light 1 on the portion 501 of the diffraction grating layer in FIG. 5, the diffraction efficiency is the highest at the point 0, and the farther away from the point 0, the lower the diffraction efficiency. From the edge to the point 0, the transmissive diffraction efficiency T on the portion 502 of the diffraction grating layer and the reflective diffraction efficiency R on the portion 501 of the diffraction grating layer gradually increase. In some embodiments, the diffraction efficiency may increase in steps, for example, from the edge to the point 0, the transmissive diffraction efficiency T on the portion 502 of the diffraction grating layer and the reflective diffraction efficiency R on the portion 501 of the diffraction grating layer increase in steps. An incident light 2 shown in FIG. 4 propagates along a direction from the portion 501 of the diffraction grating layer to the portion 502 of the diffraction grating layer, which is similar to the incident light 1 and will not be repeated here.

In some embodiments, the transmissive diffraction efficiency of the image light and the reflective diffraction efficiency of the image light are axisymmetric with respect to a direction perpendicular to the diffraction grating layer 501 and 502 and passing through the preset position point. As can be seen from FIG. 5, the transmissive diffraction efficiency T on the portion 502 of the diffraction grating layer and the reflective diffraction efficiency R on the portion 501 of the diffraction grating layer are distributed symmetrically with respect to the Z axis. Of course, in some cases, the transmissive diffraction efficiency T on the portion 502 of the diffraction grating layer and the reflective diffraction efficiency R on the portion 501 of the diffraction grating layer are not distributed symmetrically with respect to the Z axis. The transmissive diffraction efficiency T on the portion 502 of the diffraction grating layer and the reflective diffraction efficiency R on the portion 501 of the diffraction grating layer may gradually increase from the edge to the point 0, but an increasing curve of the transmissive diffraction efficiency T and an increasing curve of the reflective diffraction efficiency R may be different.

Figure 6:
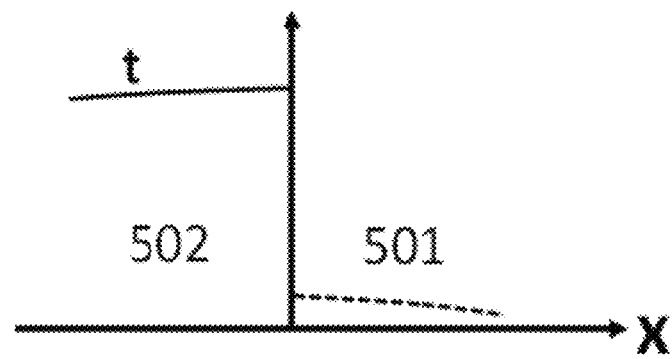
FIG. 6 is a diffraction absolute intensity diagram of image light in an optical system according to an embodiment of the present application.

Referring to FIG. 6, in the direction from one edge of the diffraction grating layer 501 and 502 to the preset position point, a transmissive diffraction intensity value of the image light passing through the substrate layer 400 is a constant; and in the direction from the preset position point to the other edge of the diffraction grating layer 501 and 502, a reflective diffraction intensity value of the image light passing through the substrate layer 400 is less than the transmissive diffraction intensity value. FIG. 6 shows the distribution of the diffraction absolute intensity of the incident light 1 at the portion 502 of the diffraction grating layer and the portion 501 of the diffraction grating layer, that is, the distribution of the diffraction absolute intensity value at the portion 502 of the diffraction grating layer and the portion 501 of the diffraction grating layer. The portion 502 of the diffraction grating layer has a nearly flat transmission energy t, i.e. a constant transmissive diffraction intensity value. Similarly, when the incident light 2 propagates from the portion 501 of the diffraction grating layer toward the portion 502 of the diffraction grating layer, the incident light 2 also has a constant transmissive diffraction intensity value at the portion 501 of the diffraction grating layer. When the incident light 1 propagates from the portion 502 of the diffraction grating layer toward the portion 501 of the diffraction grating layer, the transmissive diffraction energy of the incident light 1 is extracted by the diffraction grating layer 502 multiple times. The remaining light energy is very weak when the incident light 1 propagates to the portion 501 of the diffraction grating layer. The transmissive diffraction efficiency of the portion 501 of the diffraction grating layer for the incident light 1 is 1-R. The transmissive diffraction of the portion 501 of the diffraction grating layer for the incident light 1 is negligible. Similarly, the transmissive diffraction of the portion 502 of the diffraction grating layer for the incident light 2 is negligible. The entire area of the diffraction grating layer 501 and 502 has a uniform distribution of the transmissive diffraction energy.

In some embodiments, in the direction from the preset position point to the other edge of the diffraction grating layer 501 and 502, the reflective diffraction intensity value of the image light passing through the substrate layer 400 gradually decreases. The smaller the reflective diffraction intensity value of the image light, the better the effect of the transmissive diffraction on the diffraction grating layer 501 and 502.

The manufacturing process of the diffraction grating layer 501 and 502 may be to adjust exposure time at different positions by holographic exposure to obtain the required diffraction efficiency.

Figure 7:
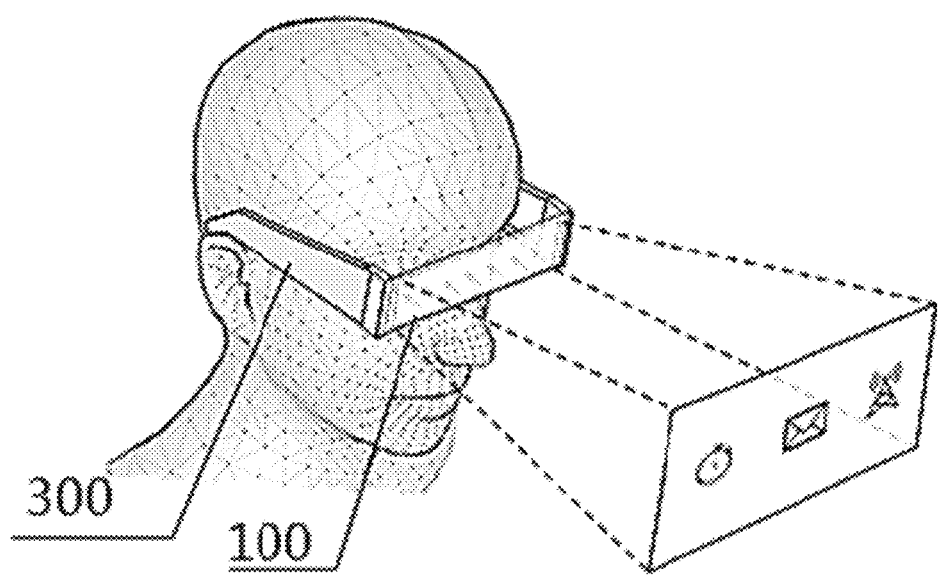
FIG. 7 is a structural diagram of a mixed reality device according to an embodiment of the present application.

Referring to FIG. 7, a mixed reality device is further provided in the present application and includes a data processing module and the above optical systems 100 and 200. The data processing module is configured to transmit image information to be displayed to projection apparatuses 101 and 102 of the optical systems 100 and 200 to display an image. The data processing module in the mixed reality device is configured to provide the image information to be displayed and transmit the image information to be displayed to the projection apparatuses 101 and 102 for the optical systems 100 and 200 to transmit the image information to be displayed to human eyes. When the mixed reality device is used as a virtual reality device, the image information is merely displayed. When the mixed reality device is used as an augmented reality device, the image information and external ambient information are displayed. The mixed reality device may be, for example, an eyeglass-type device including an eyeglass holder 300 and the optical system 100 connected to the eyeglass holder 300. The data processing module may be disposed within the eyeglass holder 300. The optical system 100 may provide an integrated full-view lens. When the user wears the eyeglass-type device, there is no blocking at the bridge of the nose, and thinner, lighter and simpler structure of the augmented reality eyeglass and improved immersion visual experience of the augmented reality eyeglass can be provided. The portion 501 of the diffraction grating layer may provide an image for the left eye. The portion 502 of the diffraction grating layer may provide an image for the right eye. Both the portion 501 and portion 502 of the diffraction grating layer correspond to the substrate layer 400, where the substrate layer 400 may be a transparent waveguide. The entire optical system 100 is filled with virtual images, and a larger eye box can be provided compared with the current augmented reality eyeglass.

The above are only better specific implementations of the present application and are not intended to limit the scope of the present application. It is easy for those skilled in the art to conceive modifications or substitutions within the technical scope of the present disclosure. These modifications or substitutions should be within the scope of the present application. Therefore, the scope of the present application should be subject to the scope of the claims.

What is claimed is:

1. An optical system, comprising:
    a projection apparatus, which is configured to project two beams of image light;
    a substrate layer, which has two side surfaces and two planes, wherein each of the two side surfaces is configured to receive a respective one of the two beams of the image light from the projection apparatus, and the two planes are configured to totally reflect each of the two beams of the image light entering the substrate layer; and
    a diffraction grating layer, which is disposed on at least one plane of the substrate layer and is configured to diffract, in a reflective manner or a transmissive manner, the two beams of the image light propagating in the substrate layer, wherein energy of target image light diffracted out of the diffraction grating layer is uniformly distributed,
    wherein in a case where the diffraction grating layer is disposed on one plane of the substrate layer, grating fringes of the diffraction grating layer are distributed axisymmetrically with respect to a direction perpendicular to the diffraction grating layer and passing through a preset position point, wherein the preset position point is located on the diffraction grating layer,
    wherein in a case where the two beams of the image light are diffracted by the diffraction grating layer in the transmissive manner, in a direction from one edge of the diffraction grating layer to the preset position point, transmissive diffraction efficiency of the image light passing through the substrate layer gradually increases; and
    in a direction from the preset position point to the other edge of the diffraction grating layer, reflective diffraction efficiency of the image light passing through the substrate layer gradually decreases.

2. The optical system of claim 1, wherein in a case where the diffraction grating layer is disposed on one plane of the substrate layer, the diffraction grating layer is configured to diffract, in the transmissive manner, the two beams of the image light propagating in the substrate layer.

3. The optical system of claim 1, wherein in a case where the two beams of the image light are diffracted by the diffraction grating layer in the transmissive manner, in a direction from one edge of the diffraction grating layer to the preset position point, transmissive diffraction efficiency of the image light passing through the substrate layer gradually increases in steps; and in a direction from the preset position point to the other edge of the diffraction grating layer, reflective diffraction efficiency of the image light passing through the substrate layer gradually decreases in steps.

4. The optical system of claim 1, wherein the transmissive diffraction efficiency of the image light and the reflective diffraction efficiency of the image light are axisymmetric with respect to the direction perpendicular to the diffraction grating layer and passing through the preset position point.

5. The optical system of claim 1, wherein the transmissive diffraction efficiency of the image light and the reflective diffraction efficiency of the image light are asymmetrical with respect to the direction perpendicular to the diffraction grating layer and passing through the preset position point.

6. The optical system of claim 1, wherein in the direction from the one edge of the diffraction grating layer to the preset position point, a transmissive diffraction intensity value of the image light passing through the substrate layer is a constant; and in the direction from the preset position point to the other edge of the diffraction grating layer, a reflective diffraction intensity value of the image light passing through the substrate layer is less than the transmissive diffraction intensity value.

7. The optical system of claim 6, wherein in the direction from the preset position point to the other edge of the diffraction grating layer, the reflective diffraction intensity value of the image light passing through the substrate layer gradually decreases.

8. The optical system of claim 1, further comprising:
two coupling prisms, wherein each of the two coupling prisms is disposed on a respective one of the two side surfaces of the substrate layer, and each of the two coupling prisms is configured to couple a respective one of the two beams of the image light from the projection apparatus into the substrate layer through a respective one of the two side surfaces.

9. The optical system of claim 8, wherein the two coupling prisms are disposed symmetrically with respect to a perpendicular line passing through a center position of the two planes of the substrate layer.

10. The optical system of claim 8, further comprising:
two reflective elements, wherein each of the two reflective elements is disposed on a respective one of optical paths where the two beams of the image light from the projection apparatus are incident on the two coupling prisms, respectively, and each of the two reflective elements is configured to reflect a respective one of the two beams of the image light from the projection apparatus to a respective one of the two coupling prisms.

11. The optical system of claim 10, wherein the two reflective elements are disposed symmetrically with respect to a perpendicular line passing through a center position of the two planes of the substrate layer.

12. The optical system of claim 10, further comprising:
a transflective element, which is disposed on optical paths where the target image light diffracted out of the diffraction grating layer is incident into human eyes, and is configured to reflect the target image light diffracted out of the diffraction grating layer into the human eyes and transmit ambient light into the human eyes.

13. The optical system of claim 1, wherein a center position of the diffraction grating layer coincides with a center position of the substrate layer.

14. The optical system of claim 1, the substrate layer is made of transparent optical glass, and the diffraction grating layer is made of transparent optical plastic.

15. The optical system of claim 1, wherein the diffraction grating layer is a holographic grating or a surface relief grating.

16. The optical system of claim 1, wherein the diffraction grating layer is manufactured by holographic exposure.

17. A mixed reality device, comprising:
a data processing module and an optical system;
wherein the optical system comprises:
a projection apparatus, which is configured to project two beams of image light;
a substrate layer, which has two side surfaces and two planes, wherein each of the two side surfaces is configured to receive a respective one of the two beams of the image light from the projection apparatus, and the two planes are configured to totally reflect each of the two beams of the image light entering the substrate layer; and a diffraction grating layer, which is disposed on at least one plane of the substrate layer and configured to diffract, in a reflective manner or a transmissive manner, the two beams of the image light propagating in the substrate layer, wherein energy of target image light diffracted out of the diffraction grating layer is uniformly distributed; and wherein the data processing module is configured to transmit image information to be displayed to the projection apparatus of the optical system to display an image,
wherein in a case where the diffraction grating layer is disposed on one plane of the substrate layer, grating fringes of the diffraction grating layer are distributed axisymmetrically with respect to a direction perpendicular to the diffraction grating layer and passing through a preset position point, wherein the preset position point is located on the diffraction grating layer,
wherein in a case where the two beams of the image light are diffracted by the diffraction grating layer in the transmissive manner, in a direction from one edge of the diffraction grating layer to the preset position point, transmissive diffraction efficiency of the image light passing through the substrate layer gradually increases; and
in a direction from the preset position point to the other edge of the diffraction grating layer, reflective diffraction efficiency of the image light passing through the substrate layer gradually decreases.

18. The mixed reality device of claim 17, further comprising: an eyeglass holder, wherein the optical system connected to the eyeglass holder, and the data processing module is disposed within the eyeglass holder.

* * * * *